US009405700B2

(12) United States Patent
Wingard

(10) Patent No.: US 9,405,700 B2
(45) Date of Patent: Aug. 2, 2016

(54) METHODS AND APPARATUS FOR VIRTUALIZATION IN AN INTEGRATED CIRCUIT

(75) Inventor: Drew E. Wingard, Palo Alto, CA (US)

(73) Assignee: Sonics, Inc., Milpitas, CA (US)

( * ) Notice: Subject to any disclaimer, the term of this patent is extended or adjusted under 35 U.S.C. 154(b) by 1218 days.

(21) Appl. No.: 13/288,582

(22) Filed: Nov. 3, 2011

(65) Prior Publication Data

US 2012/0117301 A1 May 10, 2012

Related U.S. Application Data

(60) Provisional application No. 61/410,170, filed on Nov. 4, 2010.

(51) Int. Cl.
*G06F 12/10* (2006.01)

(52) U.S. Cl.
CPC ................................. *G06F 12/1027* (2013.01)

(58) Field of Classification Search
CPC ............ G06F 12/1027; G06F 12/0292; G06F 12/0837; G06F 12/0879; G06F 12/0891; G06F 12/1081; G06F 1/206; G06F 1/3203; G06F 1/329; G06F 2201/81; G06F 2201/885; G06F 2212/1028; G06F 2212/681; G06F 9/30043; G06F 9/5094; G06F 9/05; G06F 12/1036; G06F 12/1009; G06F 13/24; G06F 2209/5014; G06F 2209/5021; G06F 2212/682; G06F 9/52; Y02B 60/1228
USPC ........... 711/E12.061, 207, E12.014, E12.022, 711/E12.036, E12.053, 138, 145, 151, 205, 711/6; 712/E9.033
See application file for complete search history.

(56) References Cited

U.S. PATENT DOCUMENTS

| | | | |
|---|---|---|---|
| 5,948,089 A | 9/1999 | Wingard et al. | |
| 6,182,183 B1 | 1/2001 | Wingard et al. | |
| 6,330,225 B1 | 12/2001 | Weber et al. | |
| 6,370,632 B1 * | 4/2002 | Kikuta et al. | ................. 711/205 |
| 6,578,117 B2 | 6/2003 | Weber | |
| 6,725,313 B1 | 4/2004 | Wingard et al. | |
| 7,120,712 B2 | 10/2006 | Wingard et al. | |
| 7,325,221 B1 | 1/2008 | Wingard et al. | |
| 7,454,590 B2 | 11/2008 | Jordan et al. | |

(Continued)

OTHER PUBLICATIONS

International Search Report and Written Opinion for International PCT Patent Application No. PCT/US11/59316 dated Mar. 15, 2012, 9 pages.

(Continued)

*Primary Examiner* — Zhou Li
(74) *Attorney, Agent, or Firm* — Rutan & Tucker, LLP

(57) ABSTRACT

Various methods and apparatus are described for communicating transactions between one or more initiator IP cores and one or more target IP cores coupled to an interconnect. A centralized Memory Management logic Unit (MMU) is located in the interconnect for virtualization and sharing of integrated circuit resources including target cores between the one or more initiator IP cores. A master translation look aside buffer (TLB) stores virtualization and sharing information in the entries of the master TLB. A set of two or more translation look aside buffers (TLBs) locally store virtualization and sharing information replicated from the master TLB. Logic in the MMU or other software updates the virtualization and sharing information replicated from the master TLB in the entries of one or more of the set of local TLBs.

24 Claims, 4 Drawing Sheets

(56) References Cited

U.S. PATENT DOCUMENTS

| | | | |
|---|---|---|---|
| 8,108,648 B2 | 1/2012 | Srinivasan et al. | |
| 8,166,214 B2 | 4/2012 | Hamilton | |
| 8,447,936 B2* | 5/2013 | Watkins et al. | 711/153 |
| 2002/0062427 A1* | 5/2002 | Chauvel et al. | 711/151 |
| 2002/0129173 A1 | 9/2002 | Weber et al. | |
| 2003/0004699 A1 | 1/2003 | Choi et al. | |
| 2003/0074520 A1 | 4/2003 | Weber | |
| 2004/0177186 A1 | 9/2004 | Wingard et al. | |
| 2006/0070069 A1* | 3/2006 | Aguilar et al. | 718/100 |
| 2007/0094429 A1 | 4/2007 | Wingard et al. | |
| 2008/0134174 A1* | 6/2008 | Sheu et al. | 718/1 |
| 2008/0320254 A1* | 12/2008 | Wingard | G06F 12/0607 711/157 |
| 2008/0320255 A1 | 12/2008 | Wingard et al. | |
| 2009/0049220 A1* | 2/2009 | Conti et al. | 710/267 |
| 2009/0193241 A1* | 7/2009 | Anwar et al. | 712/244 |
| 2009/0327647 A1* | 12/2009 | Ingle et al. | 711/207 |
| 2010/0042759 A1 | 2/2010 | Srinivasan et al. | |
| 2010/0058026 A1 | 3/2010 | Heil et al. | |
| 2010/0306458 A1* | 12/2010 | Aho et al. | 711/105 |

OTHER PUBLICATIONS

Wingard, Drew. "Socket-Based Design Using Decouple Interconnects," 2002, 30 pages. Interconnect-Centric Design for Advanced SOC and NOC.

Weber, Wolf-Dietrich, "Efficient Shared DRAM Subsystems for SOCs," Sonics, Inc., 2001, 6 pages.

OCP (Open Core Protocol) Specification, Release 2.0, OCP International Partnership 2003 OCP-IP Association, 210 pages.

Wingard, Drew. "A Non-Blocking Intelligent Interconnect for AMBA-Connected SOCs," Sonics, Inc., CoWare Arm Developer's Conference, Oct. 6, 2005, 39 pages.

Weber, Wolf-Dietrich et al., "A Quality-of-Service Mechanism for Interconnection Networks in System-on-Chips," 1530-1591/05, 2005 IEEE, 6 pages.

* cited by examiner

METHODS AND APPARATUS FOR VIRTUALIZATION IN AN INTEGRATED CIRCUIT

RELATED APPLICATIONS

This application claims the benefit of and priority to U.S. provisional patent application No. 61/410,170, filed Nov. 4, 2010 titled, "Methods and apparatus for virtualization in an integrated circuit.".

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office patent file or records, but otherwise reserves all copyright rights whatsoever.

FIELD OF THE INVENTION

Embodiments of the invention generally relate to methods and apparatus for virtualization of system resources in an integrated circuit that has multiple Intellectual Property core systems including target and initiator cores.

BACKGROUND OF THE INVENTION

In integrated circuit, a limited amount of space to house the circuitry may exist in that integrated circuit. A tradeoff occurs between increasing an amount of transactions being processed over a given period of time and the increase in area occupied by the logic and buffering required to allow a higher amount of transactions being processed over a given period of time. In some systems, physical memory space may refer to an actual size of operating memory space installed plus a PCI address range while a virtual memory space is some imaginary space abstracted over the physical memory space. Every software task running on the system is allocated with some virtual memory, which is mapped onto physical memory in some way, so that several virtual addresses may refer to the same physical address. Both virtual and physical memory spaces use pages for addressing needs.

SUMMARY OF THE INVENTION

Various methods and apparatus are described for communicating transactions between one or more initiator IP cores and one or more target IP cores coupled to an interconnect. A centralized Memory Management logic Unit (MMU) may be implemented for the interconnect and its connected devices. The centralized MMU is located in the interconnect. The centralized MMU assists in the virtualization and sharing of integrated circuit resources, which include the one or more target IP cores, the interconnect, and the one or more initiator IP cores. Hardware logic in the system wide MMU may be configured to cooperate with a miss handler mechanism to manage sharing of the integrated circuit resources. A master translation look aside buffer (TLB), which is part of the centralized MMU, is configured to store virtualization and sharing information in the entries of the master TLB. A set of two or more local translation look aside buffers (TLBs) are configured to at least locally store all or just some of the virtualization and sharing information replicated from the master TLB in the centralized MMU. The centralized MMU, master TLB and local TLBs together form a distributed system that provides virtualization and sharing services to the IP cores that are coupled to the interconnect. The virtualization and sharing services often include the translation of virtual addresses of integrated circuit resources to physical addresses that can be decoded by the address map of the integrated circuit to identify a target IP core on the integrated circuit that should be accessed by a transaction and at which target address. Initiator IP core transactions are checked first against an associated local TLB to provide 1) reduced translation latency compared to accessing the shared master TLB for every virtualization operation for the integrated circuit, 2) increased total translation bandwidth compared to accessing the shared master TLB for every virtualization operation for the integrated circuit, and 3) any combination of both. Overall, the distributed system of the centralized MMU and the master and local TLBs improves the overall virtualization speed for the integrated circuit resources, and thus, performance in the integrated circuit.

BRIEF DESCRIPTION OF THE DRAWINGS

The drawings refer to embodiments of the invention in which.

Figure 1:
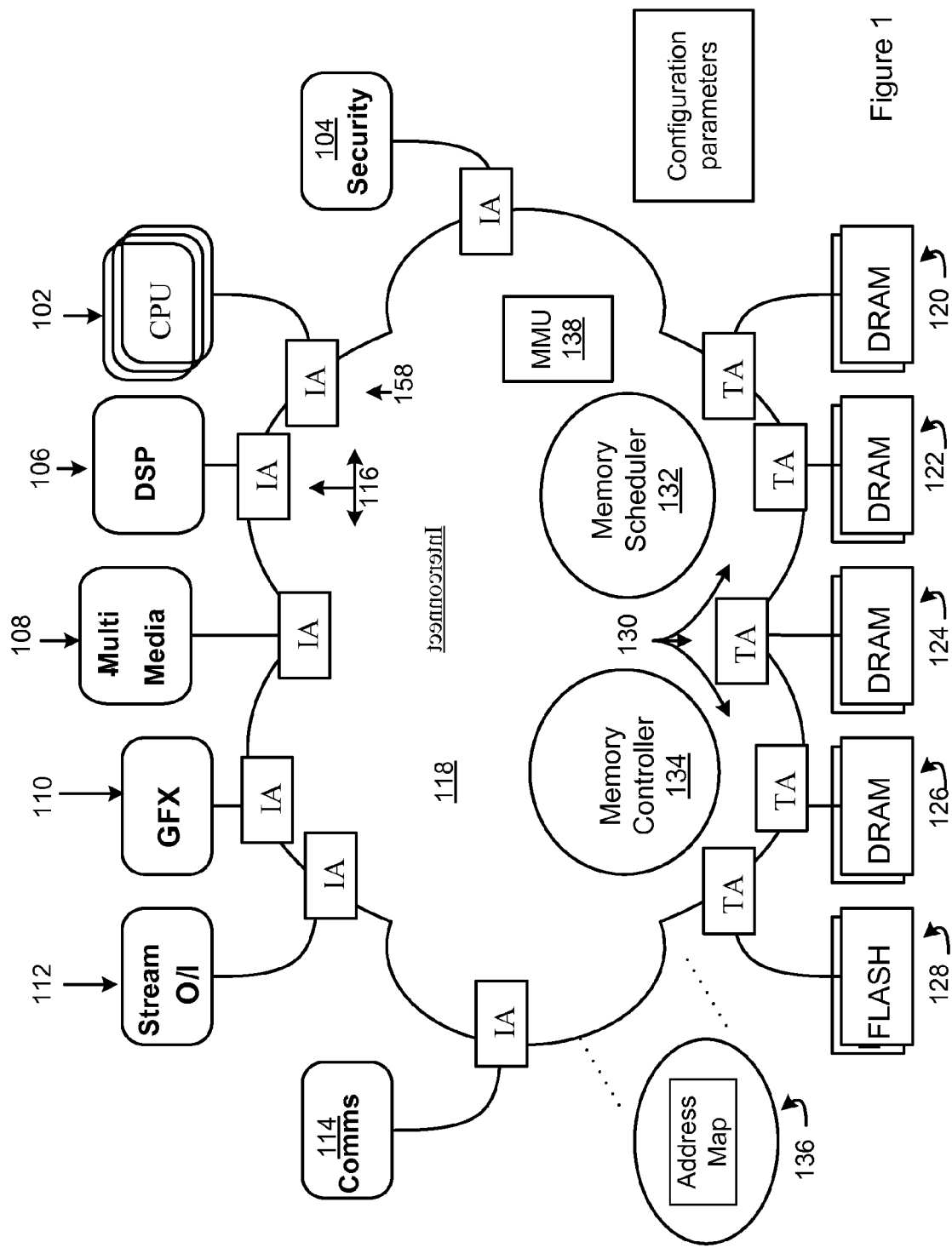
FIG. 1 illustrates a block diagram of an embodiment of a System-on-a-Chip having multiple initiator Intellectual Property (IP) cores and multiple target IP cores that communicate transactions such as read and write requests, burst requests, as well as responses to those transactions over an interconnect.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of memory channels in a target IP core, etc., in order to provide a thorough understanding of the present invention. However, it will be apparent to a person of ordinary skill in the art that the present invention may be practiced without these specific details. In other instances, well-known components or methods have not been described in detail, but rather in a block diagram in order to avoid unnecessarily obscuring the present invention. Further, specific numeric references, such as first target, may be made. However, the specific numeric reference should not be interpreted as a literal sequential order, but rather interpreted that the first target is different than a second target. Thus, the specific details set forth are merely exemplary. The specific details may be varied from, and still be contemplated to be, within the spirit and scope of the present invention.

In general, a method, apparatus, and system are described, which generally relate to an integrated circuit having an interconnect that supports virtualization of system resources in an integrated circuit. In an embodiment, a centralized MMU may be used for virtualization and sharing of integrated circuit resources. The centralized MMU in the integrated circuit may store various virtualization and sharing information in the entries in its associated master translation look aside buffer (TLB). The master TLB and a set of local micro TLBs form a distributed system that store virtualization and sharing information. The initiator IP cores and I/O devices connected to the integrated circuit, access virtual shared resources through the centralized MMU and distributed TLBs in this integrated circuit. The centralized MMU logic may be coded with the functions of tracking, decoding, and mapping of a virtual address to a physical address as well as other addressing functions and sharing functions performed on the integrated circuit.

Note, virtualization and sharing services include but are not limited to virtual address to physical address translation, virtual machine support, memory protection, logical partitioning; multiple translations in one stage, dynamic mapping of physical address to targets, dynamic mapping of physical addresses to target routes, other similar forms of virtualization, and various combinations of these.

Most aspects of the invention may be applied in most networking environments and an example integrated circuit such as a System-on-a-Chip environment will be used to flush out these aspects of the invention.

FIG. 1 illustrates a block diagram of an embodiment of a System-on-a-Chip having multiple initiator Intellectual Property (IP) cores and multiple target IP cores that communicate transactions such as read and write burst requests, as well as responses to those transactions over an interconnect. Each initiator IP core such as a central processing unit (CPU) IP core 102, an on-chip security IP core 104, a Digital Signal Processor (DSP) 106 IP core, a multimedia IP core 108, a Graphics IP core 110, a streaming Input-Output (I/O) IP core 112, a communications IP core 114, such as a wireless transmit and receive IP core with devices or components external to the chip, etc. and other similar IP cores may have its own initiator agent 116 to interface that IP core to the remainder of the interconnect 118. There may be multiple copies of some initiator IP cores, such as multicore CPU IP core cluster 102. Each target IP core, such as a first DRAM IP core 120 through a fourth DRAM IP core 126 as well as a FLASH memory IP core 128, may have its own target agent 130 to interface that IP core to the remainder of the interconnect 118. Each DRAM IP core 120-126 may have an associated memory scheduler 132 as well as DRAM controller 134. A centralized MMU 138 may be used to assist in virtualization and sharing of integrated circuit resources.

The IP cores have self-contained designed functionality to provide that macro function to the system. For example, initiator property cores such as central processing unit 102, multi-media core 108, and communication core 114 all have logic and software configured to provide that macro function to the system. Likewise, a target IP core such as a dynamic random access memory (DRAM) 126 provides that function to the system. The interconnect 118 implements an address map 136 with assigned address for the target IP cores 120-128, and potentially the initiator IP cores 102-114 in the system to route the request transactions, and potentially response transactions between the target IP cores 120-128 and initiator IP cores 102-114 in the integrated circuit. Most of the distinct IP cores communicate to each other directly over the interconnect 118 via their target ports and/or through shared buffers located in the memory IP cores 120-126, on and off chip. The target ports may be associated with each IP core's agent or be a distinct port to that IP core. The target port connections support virtualizing I/O device and direct IP core to IP core communication. The memory scheduler 132, memory controller 134, and address map 136 in each initiator agent 116 and target agent 130 abstracts the IP core addresses of each IP core 120-128 and 102-114 from the other IP cores through a combination of address translation from virtualized addresses to physical addresses and physical address map decoding.

The centralized software-visible Memory Management logic Unit (MMU) 138 may be located in the interconnect and configured to facilitate virtualization and sharing of integrated circuit resources including target cores, the interconnect, I/O devices connected to the interconnect and are treated as IP cores, and the initiator IP cores. Hardware logic in the system wide MMU may be configured to cooperate with a miss handler mechanism, such as a hypervisor software, to manage sharing of integrated circuit resources without requiring explicit management by an operating system software (OS) to track and control sharing for all operations of the virtualization and sharing aspects of these integrated circuit resources. Nonetheless, the OS may be involved in the updating of the MMU and its master translation look aside buffer (TLB) 138. Each agent 116, 130 may contain a local TLB. The set of two or more local micro TLBs store virtualization and sharing information replicated from the master TLB in the centralized MMU 138 so that the distributed TLBs of the master TLB 138 and local TLBs improve overall virtual address translation speed for the integrated circuit resources, and thus, performance in the integrated circuit.

The centralized MMU 138 in the integrated circuit may store 1) a cache of recently used mappings from the operating system's page table, 2) pre-loaded entries, 3) locked down information, and 4) other similar information in these entries in its associated master translation look aside buffer (TLB). The master TLB and the set of local micro TLBs form a distributed system that store virtualization and sharing information.

When a virtual address needs to be translated into a physical address, generally a local TLB containing a replicated copy of a subset of the entries in the master TLB is searched first. Thus, the entries of the local TLB can be searched to see if a match to a virtual address is stored in the entries of the local TLB. If a match is found (a local TLB hit), the physical address is returned and access to the shared integrated circuit resource, such as a target memory core, can continue. However, if there is no match/the requested virtual address is not in the entries of the local TLB, it is called a local TLB miss. On a local TLB miss, the miss handler mechanism may 1) look up the address mapping in the master TLB and if not in there then look in the page table to see whether a mapping of virtual to physical addressing for that shared integrated circuit resource exists (a Page Walk), 2) send an address translation request to the centralized MMU, which searches the master TLB or the system page tables with the goal of providing a new translation entry to the local TLB, and/or 3) perform other similar updates described later on. Thus, on a TLB miss, the miss handler mechanism, for example, sends an address translation request to the centralized MMU, which searches the master TLB or the system page tables with the goal of providing a new translation entry to the local TLB. The centralized MMU first searches the master TLB for a matching translation entry and if that search fails (a master TLB miss), the MMU begins a search of the system page table(s) to see whether a mapping of virtual address exists to be conveyed to the local TLB. Thus, when the local TLB lacks a translation entry, then the translation proceeds by checking other entries in the master TLB and/or by looking up the page table in a process called a page walk. If one exists, the information for the entry is written back to the local TLB, the original transaction is checked again against the local TLB, and the resulting local TLB hit allows the transaction to proceed. Thus, after the local TLB miss, the virtual to physical addressing for that shared integrated circuit resource is replicated over to the local TLB from the centralized MMU's master TLB. This update of the entries in the local TLB is done for the initiator IP cores, including I/O devices connected to the interconnect, that access virtualized and shared resources through the centralized MMU and distributed TLBs in this integrated circuit. A subsequent translation will find a TLB hit in the local TLB, and the next request transaction to use that shared resource, such as a memory access, will continue without needing an update. Note, in general, a page walk is a slower expensive process, as it involves reading the contents of multiple memory locations and using them to compute the physical address. Overall, after the page walk determines the physical address, the virtual address to physical address mapping are entered into the master TLB and then replicated over to an entry in the local TLB.

In some embodiments, the centralized MMU logic is coded with the functions of tracking and maintaining the virtual address to physical address translation information in the master TLB, as well as decoding and mapping the virtual address to a physical address. Substantial synergies exist by having the centralized MMU logic with its coded address functions coupled with other addressing functions and virtualization functions performed on the integrated circuit. For example, the same logic hardware in the MMU that tracks the virtual address to physical address decoding and mapping functions may also decode the physical addresses using the address map to determine which actual target IP cores are located at those physical addresses and map the physical addresses into the form expected by the target IP cores. Likewise, the same logic hardware in the MMU that tracks the virtual address to physical address decoding and mapping functions may also decoding address tiling and multiple channel parameters. Thus, a multichannel decode can happen as part of the address translation rather than in series with address translation, which can reduce the overall decoding and translation delay and thereby increase system performance. Additionally in some embodiments, during operation, the centralized MMU logic remaps CPU 102 boot addresses and interrupt vectors from the non-volatile flash memory 128 to a higher performance volatile memory, such as DRAM 120, after the booting process has preloaded the DRAM, perhaps during a soft reset that causes CPU 102 to reboot from the preloaded DRAM.

The interconnect 118 provides a shared communications fabric, such as a bus, between IP core sub-systems 120-128 and 102-114 of the system. All the communication paths in the shared communication fabric need not pass through a single choke point, rather many distributed pathways may exist in the shared communication fabric. There may be several physical pathways between a given initiator IP core and a given target IP core. The on-chip interconnect 118 may be a collection of mechanisms that may be adapters and/or other logical modules along with interconnecting wires that facilitate address-mapped and arbitrated communication between the multiple Intellectual Property cores 102-114 and 120-128. The interconnect may be composed of different topologies, including buses, crossbars, rings and routers, or combinations of these.

The interconnect 118 may be part of an integrated circuit, such as a System-on-a-Chip, that is pipelined with buffering to store and move request and response transactions in stages through the System-on-a-Chip. The interconnect 118 may have flow control logic that 1) is non-blocking with respect to requests from another thread, as well as with respect to requiring a response to an initial request before issuing a subsequent request from the same thread, 2) implements a pipelined protocol, and 3) maintains each thread's expected execution order. The interconnect 118 also may support multiple memory channel modules in a single aggregate target, with 2D and address tiling features, response flow control, chopping of individual burst requests, and distribution of requests headed to that aggregate target in either a linear or non-linear sequential pattern in channel round order.

As discussed, each initiator IP core may have its own initiator agent to interface with the interconnect. Each target IP core 120-128 may have its own target agent 130 to interface with the interconnect 118. Some IP cores may have both initiator and target interfaces and may thus connect to both an initiator agent and a target agent. Note, IP cores can include input output (I/O) devices external to the Chip but connect through an I/O port to the interconnect.

A target IP core that only supports a single thread or tag, such as flash memory 128, should normally return responses to request transactions made by the initiator IP core, such as communications core 114, in the same order in which the requests were issued by the initiator IP core. A target IP core that supports multiple threads or tags, such as DRAM 120, may return responses to request transactions that arrive on independent threads or tags in an arbitrary order.

A multiple threaded initiator IP core, such as CPU 102, may generate two or more distinct threads or tags of related transactions, with flexible reordering between the transactions occurring on distinct threads or tags.

Each memory channel module may be an IP core or multiple external DRAM chips ganged together to act as a single aggregate memory to match the width of a data word such as 64 bits or 128 bits. Each memory IP core and DRAM chip may have multiple banks inside that IP core/chip.

Many kinds of IP core target blocks can be combined and have their address space interleaved. The below discussion will use discreet memory blocks as the target blocks being interleaved to create a single aggregate target in the system address space. An example "aggregate target" described below is a collection of individual memory channels, such as distinct external DRAM chips, that share one or more address regions that support interleaved addressing across the aggregate target set. Another aggregate target is a collection of distinct IP blocks that are being recognized and treated as a single target by the system.

Distinct memory IP cores can be divided up in defined memory interleave segments and then interleaved with memory interleave segments from other memory IP cores. Two or more discrete memories modules, including on chip IP cores and off chip memory cores, may be interleaved with each other to appear to system software and other IP cores as a single memory (i.e., an aggregate target) in the system address space. Each memory module may be an on-chip IP memory core, an off-chip IP memory core, a standalone memory bank, or similar memory structure. The interconnect implements the address map with assigned address for the plurality of target IP cores in this integrated circuit, including a first aggregate target with two or more memory channels that appear as a single target to the initiator IP cores.

The entries in the master TLB of the centralized MMU 138 may also store information generally not in a page table, including information not managed by an operating system software selected from 1) an identifier for a target agent associated with the address translation entry, 2) address decoding parameters of the aggregate target IP core with multiple channels, 3) address tiling parameters of the one or more address regions making up the system address map, and 4) any combination of these items of information. The entries in the local TLB also store information generally not 1) in a page table, 2) in the entries of the master TLB entries, and information not managed by an operating system software, where the additional stored information in the local TLB is selected from 1) an identifier for a target agent associated with the address translation entry, 2) address decoding parameters of the aggregate target IP core with multiple channels, 3) address tiling parameters of the one or more address regions making up the system address map, 4) detailed routing information to describe the interconnect pathways used by requests issued by this local TLB's associated IP initiator cores to the various target agents connected to the interconnect, and 5) any combination of these items of information.

Figure 2:
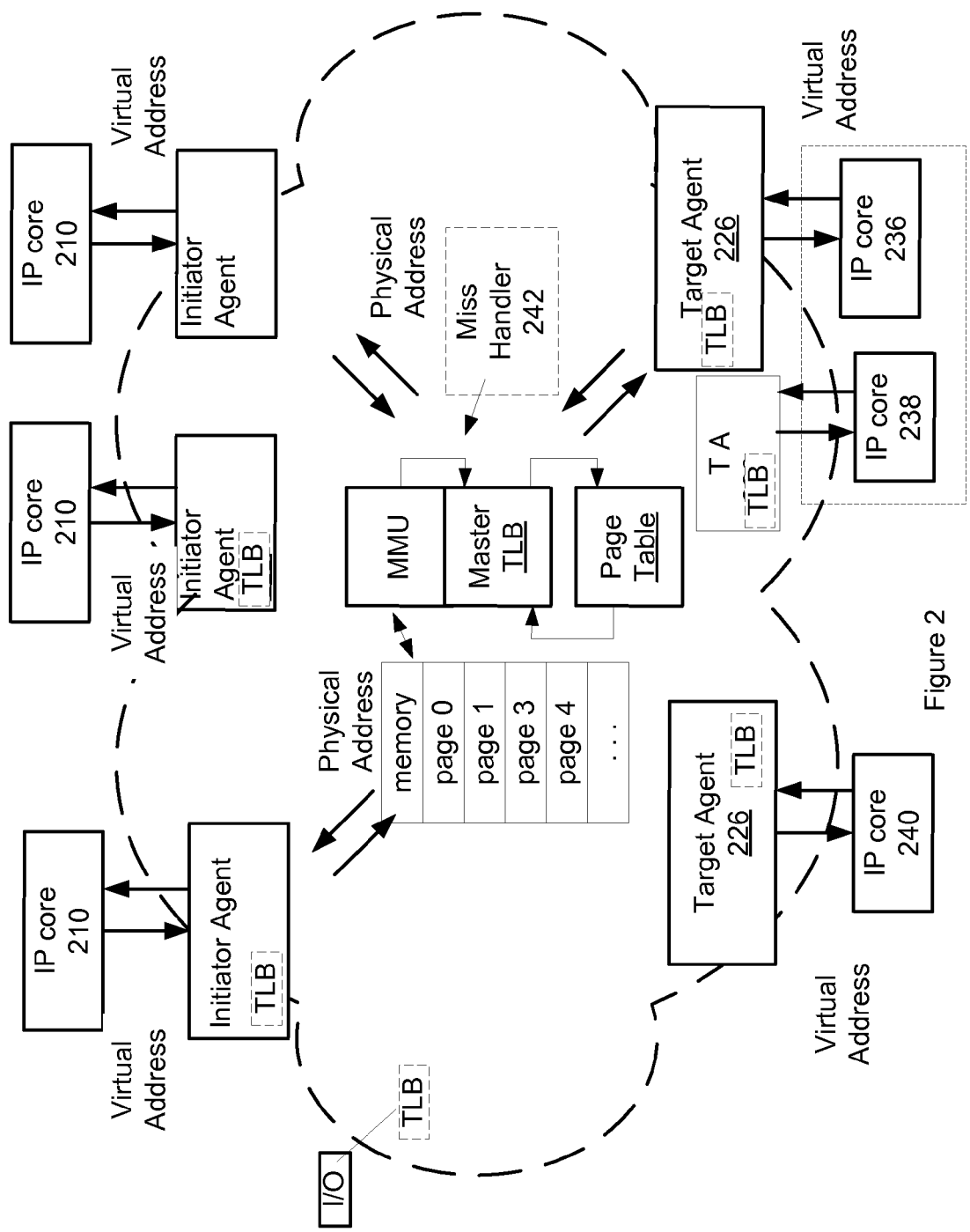
FIG. 2 illustrates a block diagram of an embodiment of an integrated circuit with a centralized MMU and system of distributed TLBs.

FIG. 2 illustrates a block diagram of an embodiment of an integrated circuit with a centralized MMU and system of distributed TLBs.

The centralized software-visible Memory Management logic Unit (MMU) 238 located in the interconnect for virtualization and sharing of integrated circuit resources, including target cores, I/O devices connected to the chip, etc., between the one or more initiator heterogeneous IP cores. The hardware logic in MMU 238 may send a shadow copy of entries in the master translation look aside buffer (TLB) portion of the MMU to one or more corresponding local TLBs in the set of local micro TLBs. A local TLB may be located in an agent, such as a first local TLB in agent 216, or be a distinct structure from the agent itself. The master TLB, which is part of the centralized MMU 238, stores virtualization and sharing information in the entries of the master TLB. This virtualization and sharing information may include a translation of a virtual address of an integrated circuit resource to a physical address of that integrated circuit resource. The hardware logic in the centralized MMU also has a detection unit coded to automatically detect for page table update operations generated by the one or more initiator cores on the interconnect, which causes a miss handler mechanism 242 to update the information stored in one or more entries of the master TLB, and then the virtualization and sharing information in the master TLB is updated into the entries of one or more of the set of local TLBs. In addition to the other ways described, the entries of one or more TLBs may be updated by 1) copying the changed information to the master TLB and forwarding it to the one or more local TLB devices, 2) invalidating existing entries that may be impacted by the page table update operation and letting the TLB miss handlers fetch a proper replacement the next time the translation is needed, and 3) any combination of these. As discussed, local TLB entries can contain information/entries that are also in the master TLB, but pre-loaded and locked down entries in the local TLB entries would not necessarily be in the master TLB. Note, some examples of pre-loaded and locked down information in some of the entries of a TLB 1) support guaranteed response times because TLB miss processing can be slow and/or 2) support mappings not under the control of the OS such as the configuration of multiple channel interleaving or mappings that must be present during the booting process before the OS is active.

Hardware logic in the centralized MMU is configured to cooperate with a miss handler mechanism 242 to manage the sharing of integrated circuit resources. The miss handler mechanism 242 may be one or more of the following 1) an operating system software (OS) resident in the integrated circuit, 2) a hypervisor software resident in the integrated circuit, 3) a hardware page table walker logic unit, or 4) any combination of the three cooperating together along with the centralized MMU 238 to do a page table walk in order to update the entries in the master TLB in the centralized MMU. Thus, at least one of 1) an operating system software resident in the integrated circuit, 2) a hypervisor low-level software resident in the integrated circuit, and 3) a hardware page table walker logic unit, update the master TLB in the centralized MMU 238 to automatically invalidate any shadow entries in the local TLBs in order to maintain coherence. The logic in the MMU 238 may broadcast a signal to 1) invalidate the corresponding information in the local TLBs, 2) may send a signal to update the actual information stored in the entry of the local TLB, or take a similar action. Accordingly, the task of filling entries in the master TLB with address translations from the page table is under the control of 1) a dedicated hardware page table walker logic unit acting as a hardware based miss handler mechanism 242, 2) the operating system software, 3) the hypervisor software acting as a software based miss handler mechanism 242, or 4) any combination of the three cooperating with each other.

The Centralized MMU

The centralized MMU 238 is a logic hardware component responsible for handling accesses to shared integrated circuit resources requested by the initiator IP blocks. The logic in the centralized MMU 238 cooperates with a software based miss handler mechanism 242 to implement addressing software and hardware features handled within the interconnect that include 1) virtualizing an address decode of an aggregate target IP core with multiple channels, 2) facilitating non-blocking transaction flow control for request and response communication transactions across the interconnect, and 3) virtualizing address tiling of one or more address regions making up a system address map, and 4) cooperating with a hypervisor software to isolate an operating system software from needing to know the virtualized address details of the shared integrated circuit resources.

The centralized MMU 238 functions include translation of virtual addresses to physical addresses. The MMU 238 normally translates virtual page numbers to physical page numbers via an associative master TLB. The master TLB may be a memory structure of sorts that includes operating system page tables. The MMU 238 divides the virtual address space (the range of addresses used by the system address map) into pages, each having a size that is a power of 2, usually a few kilobytes, but they may be much larger. The centralized MMU 238 has logic configured for address translation and sharing of resources in the integrated circuit including the address translation and sharing of two or more target IP cores set as an aggregate target with multiple channels 237, which is shared by the one or more initiator IP cores. Thus, the MMU 238 has address logic to translate and decode multiple channel addressing, and concurrency logic to support non-blocking flow control of multiple threads from same initiator IP core to the multiple channel target core. The MMU 238 has logic configured to also decode an address region with an address-tiling algorithm to optimize the storage and retrieval of data from that address region based on the type of initiator IP core using that address region. The MMU's logic 238 captures full address translation and target/routing selection.

Translation Look Aside Buffers

As discussed, the master TLB may be a memory structure of sorts that at least includes operating system page tables. The master TLB of the centralized MMU 238 may be in 1) a cache structure local to the MMU logic 238, 2) in a secure system memory space, 3) in a content-addressable memory structure, or 4) in any combination of the three. The master TLB is really useful if stored locally and optimized for low latency access as a content addressable memory. The master TLB is organized and implemented with a large memory storage capacity in terms of kilobytes to megabytes in size. In an embodiment, the large master TLB is part of the system wide MMU 238 and located in Register Target (RT) in the interconnect.

In an embodiment, each translation lookaside buffer (TLB) may be implemented as a content-addressable memory (CAM). The CAM search key is the virtual address and the search result is a physical address. The TLB has a fixed or programmable number of slots that contain page table entries, which map virtual addresses to physical addresses. Each page table may be a data structure used by the centralized MMU 238 in the integrated circuit to store the mapping between virtual addresses and physical addresses. The virtual address of the target IP cores and Input Output devices connecting to the integrated circuit is the space seen from a process occurring in the initiator IP cores and/or Input Output devices. This space is segmented in pages of a prefixed size such as 4 kB or supersized pages or some combination. The page table (generally loaded in memory) holds a trace of where the virtual pages are loaded in the physical memory. The TLB includes a cache of the page table that is only a subset of its content is stored.

The page table holds the mapping between a virtual address of a page and the address of a physical frame. There is also auxiliary information about the page such a present bit, a dirty or modified bit, address space or process ID information, which address space a page belongs to, statistics information, amongst others.

Each local micro TLB generally stores a subset of the virtualization and sharing information stored in the master TLB. The hardware logic in the centralized MMU 238 also is coded to send a shadow copy of entries in a master TLB portion of the MMU 238 to replicate the subset of the virtualization and sharing information in the entries of a corresponding TLB from the set of local TLBs in order to keep the corresponding local TLB coherent with the master TLB. The subset of the virtualization and sharing information replicated and stored in the local TLB is relevant to the one more IP cores, which includes Input-Output devices that the local TLB is servicing. The subset of the virtualization and sharing information replicated means that 1) there are fewer entries in the local TLB's than the amount of entries in the centralized MMU, 2) each entry in the local TLB has less information than the corresponding entry in the master TLB, and 3) any combination of both.

Thus, each local TLB may maintain a shadow copy of a subset of the entries maintained in the master TLB. The subset of entries replicated in the local TLB is relevant to the IP core or a group of IP cores that the local TLB is potentially associated with. The centralized system wide MMU 238, cooperating with 1) the master TLB and 2) the local shadow copies of small sized TLBs located in potentially each initiator agent in the interconnect, form a distributed system. The distributed local TLBs aid the performance attribute of a single chip as well as a distributed system across multiple chip SoC's.

Both the centralized software-visible MMU 238 and some or all of the set of local TLBs are instantiated and located 1) in the interconnect 2) in a respective initiator agent that is coupled between a main fabric of the interconnect and the initiator IP core itself, 3) in an I/O bus controller coupled between I/O devices connected to the integrated circuit and the main fabric of the interconnect, 4) in a bridge agent between two discrete chips, 5) in the bridge agent between two discrete interconnects, and 6) any combination of the five. Generally, one local TLB cache is instantiated in a respective initiator agent, which requires the translation support of the TLB for virtualization and sharing of integrated circuit resources.

However, the set of local TLBs may consist of both types of TLBs 1) a local TLB located in an agent for an individual initiator IP core AND 2) one or more pooled local TLBs. Each pooled local TLB is shared by a group of initiator IP cores that do not have individual TLBs and the pooled local TLB is located in the interconnect near the group of initiator IP cores. Thus, one or more pools of local TLB caches may be shared by a group IP cores, which includes I/O devices that do not have individual local caches and I/O devices that were not set up capable for virtualization. Alternatively, the pool of local TLBs could be located close to the MMU's centralized master TLB. Each local TLB may be small in kilobyte size compared to the master TLB.

As discussed, in an embodiment, the master TLB stores a cache of recently used mappings from the operating system's page table. The master TLB replicates a subset of its entries into each of the distributed set of local TLBs. When a virtual address needs to be translated into a physical address, the entries of a local TLB is initially searched to see if a match to the virtual address is stored in that local TLB. Access to the shared integrated circuit resource is allowed, if a match is found (a TLB hit) in the local TLB. The physical address is returned and then the access to the shared integrated circuit resource can continue. However, if there is no match/the requested virtual address is not in the entries of the local TLB, it is called a TLB miss, and the miss handler mechanism 242 will typically look up the address mapping in the master TLB, and if not in there, then look in the page table to see whether a mapping of virtual to physical addressing for that shared integrated circuit resource exists (a Page Walk). Thus, when the local TLB lacks a translation entry, the translation proceeds by checking other entries in the master TLB or by looking up the page table in a process called a page walk. If one exists, the information for the entry is written back to the local TLB and the translation process is re-started. In an embodiment, the local TLB is integrated inside an initiator agent 216 that waits for the local TLB miss to be serviced by the centralized MMU and the initiator agent is responsible for re-starting the translation process without notifying the connected initiator IP core 210. In an embodiment, the local TLB miss is communicated to the initiator IP core and re-starting the translation may consist of 1) re-starting the faulting instruction or 2) sending a retry signal to the initiator IP core. This must be done, as the initiator IP cores and I/O devices connected to the integrated circuit access virtual shared resources through the centralized MMU 238 and distributed TLBs in this integrated circuit. This subsequent translation will find a TLB hit, and the request to use that shared resource, such as a memory access, will continue. By keeping a copy of the translation in the local TLB, subsequent accesses to virtual addresses that are in the same page of the address space will also find a TLB hit, thereby improving performance by reducing the number of local TLB misses that must be serviced. After the page walk determines the physical address, the virtual address to physical address mapping are entered into the master TLB and then replicated over to an entry in the local TLB. The data structure itself for this process is typically called a page table and the data found in such data structures are typically called page table entries (PTEs).

Figure 3:
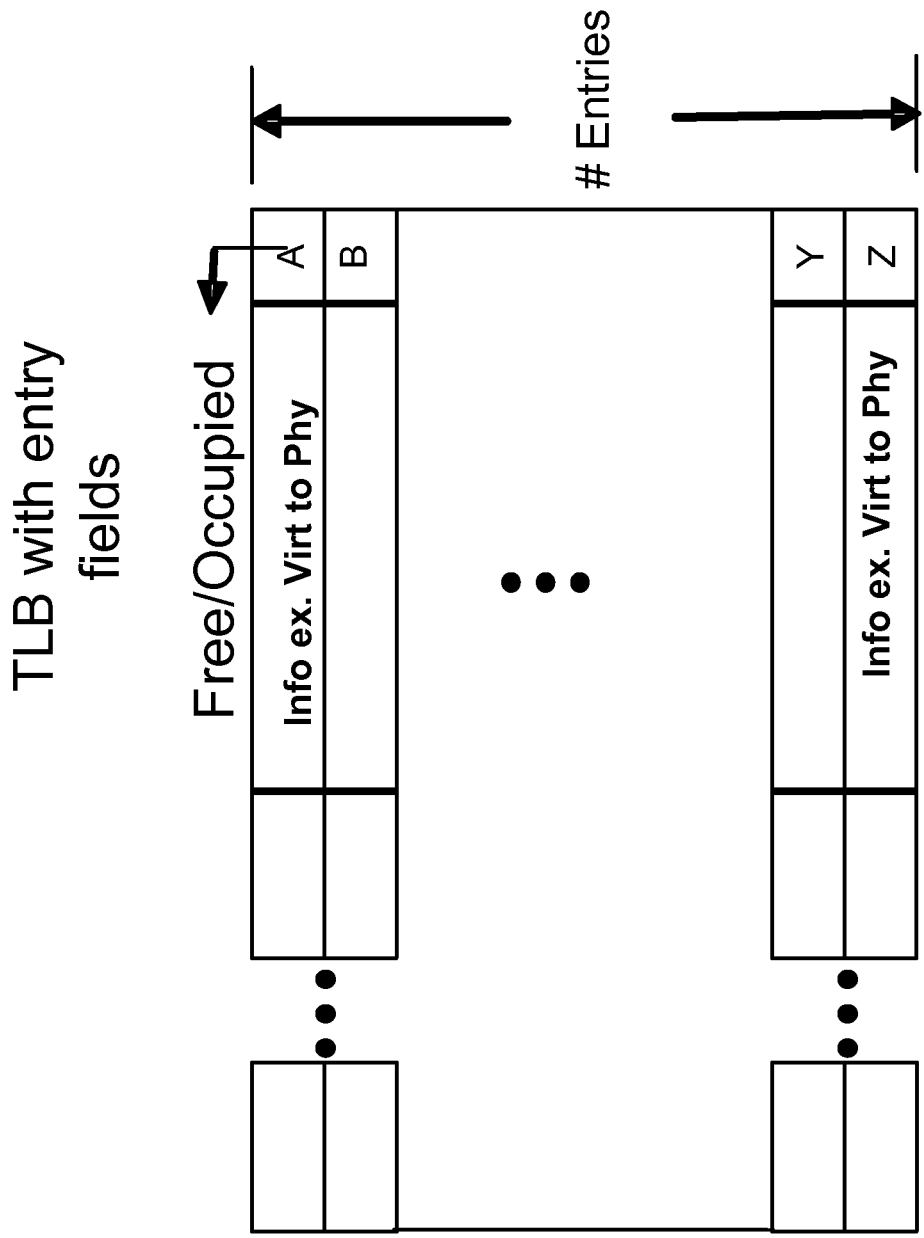
FIG. 3 illustrates a block diagram of an embodiment of an example TLB with entries.

The number of entries in either the master TLB or the local TLB may be a programmable amount. For example, see FIG. 3 for an example TLB with entries. The TLB has 1) a fixed or 2) a programmable number of rows that each contain one TLB entry. Each entry is composed of one or more fields, such as a page table entry, which can store information to map virtual addresses to physical addresses. Different parameters and information may also be stored and updated in these fields of the master TLB of the centralized MMU 238, or the local TLBs. Searching the TLB for a match normally involves using part of a virtual or physical address to index the TLB and then to compare some of the fields from the indexed entry against other parts of the address or other information provided along with the transaction. Some example information stored in the entry fields are as follows:

a) Fields may exist in the master TLB for the address translation of a virtual address in a transaction communication to the physical address of the intended integrated circuit system resource, such as a target core in the integrated circuit or I/O device coupled to the integrated circuit.

b) Fields may exist in the master TLB to support all interconnect address decoding and mapping capabilities including target IP cores operated and addressed as a multiple channel device and/or address regions employing an address tiling function.

c) Fields may exist in the master TLB to also include information about whether a virtual page has been written to (the dirty bit), when the page was last used (the accessed bit, for a least recently used page replacement algorithm), what kind of processes and/or IP cores (user mode, supervisor mode) may read and write the page and/or the physical address, and whether the TLB entry should be cached and replicated in a specific set of one or more local TLBs. Thus, the entry can have fields that hold auxiliary information about the page such a present bit, a dirty or modified bit, address space or process ID information, which address space a page belongs to, statistics information, amongst others.

The TLB entry may have fields that contain information used to prohibit access to a virtual page based on various conditions. Master TLB entries may include protection information to indicate 1) a given IP core's mode of operation, including security state (potentially provided by a hardware signal like OCP MReqInfo or AMBA TrustZone), 2) virtual machine ID bits (MReqInfo, MAddrSpace), and 3) any combination of these TLB entries that can prohibit a communication transaction's access to a virtual page, wherein access is not allowed if the communication transaction's protection information is not compatible with the protection information stored in the master TLB entry. The protection information for a communication transaction may be provided by an initiator IP core. IP core operating mode may be presented on hardware signals like the OCP MReqInfo or AMBA AXI ARPROT and AWPROT. Virtual machine ID bits may be presented on hardware signals like OCP MReqInfo or MAddrSpace and augment virtual addressing for multiple OS/virtualization support, since each guest operating system can be assigned a unique virtual machine ID and the centralized MMU can then limit address translations to only those master TLB entries that match the virtual machine ID. Also, master TLB entries can support independent address views per initiator by supporting different address translations based upon the initiator IP core that issues the communication transaction. These master TLB entries may also store information to form groupings of multiple initiators into same initiator group with access rights, etc.

Entries in TLB support programmable fabric routing to destination target(s). The MMU logic supports congestion optimization based on operating modes. This requires quiescence of affected routes.

Each page table may be a data structure used by the centralized MMU 238 in the integrated circuit to store the mapping between virtual addresses and physical addresses. This page table space is segmented in pages of a prefixed size such as 4 KB or super sized pages.

A TLB Refill exception is generated when there are no entries in the TLB that match the mapped virtual address. A TLB Invalid exception is generated when there is a match but the entry is marked invalid. A user may control of the refill/preload of the master TLB, which is then shadow copied to a corresponding local TLB in or near an agent for the IP core or I/O device.

In the case of when 1) an initiator IP core or an Input Output device is not set up to be a virtualized system or 2) the integrated circuit is without a hypervisor, then the OS changes page table information for a TLB entry of its IP cores and the OS has to forward the information to the driver in charge of managing the centralized MMU 238 engine to flush the same entry (if it is present) in the master TLB. The logic in the centralized MMU 238 engine will propagate the information to all local TLBs containing a shadow copy of that entry to perform the same operation. There may be a single local TLB or a set of agents each having their own local TLB that have the subset of information propagated to. In some cases, the OSes may have or be modified to have a mechanism to inform a driver that a TLB entry was flushed.

In general, a flush may be any situation where a TLB entry is replaced. However, most CPU TLB operations will be replacements of entries due to TLB misses. None of these operations would ever require notification from the centralized MMU 238 to the local TLBs distributed throughout the interconnect fabric. The logic in the MMU 238 merely distributes CPU TLB operations that result from the OS changing the page tables (virtual/physical translation, shareability, etc.) for pages that are covered by the local TLBs the interconnect fabric and would require fabric TLB invalidations.

The hypervisor software may be configured to send the centralized MMU entry invalidations without involving the OS when an entry in the page table is updated or has an entry invalidated. For example, when the hypervisor is invoked each time the OS needs to update the page tables and/or invalidate a CPU TLB entry, then the hypervisor software may send the centralized MMU entry invalidations without involving the OS. The hypervisor software maintains a coherence of the centralized MMU with other MMUs in the system without modifying the OS and propagates OS-directed TLB operations to cause master TLB invalidations on behalf of the OS; and thus, the hypervisor software provides a safe external way to receive notification of TLB operations and send associated invalidations to the master TLB. The logic in the centralized MMU then propagates invalidations that occur in the master TLB to the local TLBs.

Note the miss handler may be configured to manage invalidations or may allow another component to do this function. It can be required that the invalidations happen when the page table (usually in DRAM) is updated, so it is normal that the OS trigger invalidations as part of any operation that changes an existing page table entry. The logic is configured to ensure that these invalidations get communicated to our MMU, since the OS is normally only concerned with the CPU's internal MMU.

In the case of when an initiator IP core or an Input Output device is set up to be a virtualized system, the hypervisor software can flush the master TLB without modifying the OS and then the hypervisor software can propagate the operation to centralized master TLB transparently on behalf of the OS. The hypervisor software provides a safe external way to receive notification of TLB operations to the master TLB. The logic in the master TLB then propagates the shadow copied entry into the corresponding local TLBs.

Translation hardware may be in the interconnect for non-CPU devices such as accelerators and I/O devices, and the page table entries for data structures/buffers used by these non-CPU devices is expected to be relatively static and normally only changed with major mode changes in the device. These mode changes will necessarily involve substantial interaction with many device drivers, and the resource manger mechanism will then have ample notice and opportunity to manage the master TLB and the set of local TLB's as part of this process.

Also, the centralized MMU 238 can support simultaneous outstanding requests to update the shadow copied entries from two to all of the local TLBs. The centralized MMU 238 is a pipelined machine, so the number of active requests that are simultaneously supported is as deep as its pipeline. The centralized MMU 238 can also support simultaneous centralized TLB misses (i.e. servicing of requests to the centralized TLB that result in misses). The centralized MMU 238 can service more than one at a time. This may be more an issue of what are the capabilities of the operating system's ability to manage multiple misses than whether hardware can service more than one at a time. A pipelined centralized MMU improves performance. Traffic studies can be used for each instance to understand how many local TLBs are needed and which page size is used for each type of IP core and then how many misses must occur for a result in request to centralized TLB. Note, the hypervisor can intervene either when the TLB miss occurs or when the TLB is manipulated. Each local TLB may rely on the centralized MMU for local TLB miss help.

Hypervisor

As discussed, the task of filling the master TLB with address translations into entries in the TLB from the page table is under the control of a dedicated hardware page table walker logic unit, or operating system software, or hypervisor software or any combination of the three cooperating with each other.

Thus, the miss handler mechanism 242 may be a hypervisor software or OS software, in which the miss handler mechanism 242 manages the entries of the master TLB, and on a TLB miss generates a "TLB miss" exception, in which the operating system must walk the page tables and perform the translation in software, and then the operating system passes the information to the hypervisor, which then loads the translation into an entry of master TLB and signals the OS software to 1) restart the program or 2) send a 'retry signal' to an initiator core that sent the instruction that caused the TLB miss. As with hardware TLB management, i.e. the page-table walking hardware logic unit, if the OS finds no valid translation in the page tables, a page fault has occurred, and the OS must handle it accordingly. This can be how TLB misses are handled.

The hypervisor software can be coded to perform at least two key requirements. The first coded functional requirement is protected access to I/O or memory resources from a given virtual machine, such that it cannot interfere with the operation of another virtual machine on the same platform. This isolation by the hypervisor between virtual machines is essential for achieving availability, reliability, and trust. The second coded functional requirement is the ability to share I/O resources among multiple virtual machines. In many cases, it is not practical or cost-effective to replicate I/O resources (such as storage or network controllers) for each virtual machine on a given platform. The hypervisor software may become the normal intermediate layer to enable virtualization and separate guest OS from each other and from SoC hardware as well as create the isolated "logical partitions."

The hypervisor may be low-level software with some dedicated hardware components that presents a virtual machine within a logical partition to a Guest OS. Hypervisors manage all partitions in the system. The hypervisor presents the guest operating systems with a virtual platform and monitors the execution of the guest operating systems. In that way, multiple operating systems, including multiple instances of the same operating system, can share hardware resources.

A virtual machine created on the integrated circuit is a software implementation of multiple hardware resources, which are shared and utilized by multiple OS programs running on the integrated circuit. The virtualization separates each operating system from the underlying hardware platform resources. The hypervisor virtual layer acts kind of as the lowest level of operating system software to perform address translations of a virtual address to a physical address for memory components, input output devices, etc. Also, sensitive instructions that may affect the other virtual machines running on this same hardware are intercepted by the hypervisor virtual layer and replaced by binary translation or trapped by hardware. For proper device isolation in a virtualized system, the interrupt requests generated by I/O devices must be controlled by the hypervisor by interrupt remapping.

The hypervisor traps and authenticates all TLB updates from any of the two or more Operating Systems resident on the integrated circuit and allows the update to occur when that update will not interfere/conflict with a current operation of another OS resident on the integrated circuit. The hypervisor relies on the binary translation to trap and virtualize the execution of certain sensitive, non-virtualizable instructions. With this approach, critical instructions are discovered (statically or dynamically at run-time) and replaced with traps into the hypervisor to be emulated in software.

The centralized MMU 238 in cooperation with a hypervisor software acting as the miss handler mechanism 242 restricts a given initiator IP core's accesses to physical address space in the integrated circuit, such as memory address space, and also enforces I/O device memory accesses via creating logical partitions and maintaining page tables. This restriction can be implemented by adding virtual machine ID bits into the entries of the master and local TLBs that associate each entry with a logical partition. When the local and master TLBs attempt to translate a virtual address, they compare the virtual machine ID bits associated with the initiator IP core access request with the virtual machine ID bits in their translation entries, and only allow TLB hits to occur if the virtual machine ID bits match. The hypervisor may be responsible for providing the virtual machine ID bits as it translates the operating system TLB updates to the master TLB.

Hardware logic portals are dedicated to each partition to support virtualization of select interfaces or accelerator engines in MMU 238. Memory protection from malicious or misbehaving devices is implemented within the centralized MMU 238, its master TLB, and the hypervisor software and/or operating system. A device cannot read or write to memory that has not been explicitly allocated (mapped) for it. The memory protection is based on the fact that the hypervisor and/or operating system running on the integrated circuit exclusively controls the MMU 238, and can associate individual translation entries with specific operating modes, such as user/supervisor or non-secure/secure, and/or specific initiator IP cores. If this protection information is stored in the page table entries or added while updating the master TLB, the TLBs can enforce the protection by not allowing address translations that fail to match the operating mode and/or initiator IP core restrictions associated with the entry to achieve a TLB hit. Thus, the initiator IP cores in the integrated circuit are physically unable to circumvent or corrupt the configured memory management tables in the master TLB. This allows for hardware resource sharing and ensures security, of the target IP cores as well as input output devices connected the integrated circuit. The isolation created by the partitions keeps untrusted programs and Input Output devices away from secure areas of the chip.

A key benefit of an MMU 238 is memory protection: a hypervisor software can use the MMU 238 to protect against errant programs, by disallowing access to memory that a particular program should not have access to. Typically, the hypervisor software assigns each initiator core, or OS, its own virtual address space.

Programs in a virtual partition created by hypervisor may use the operating system's normal system call interface. The Hypervisor can intervene either at the TLB miss or when the TLB is manipulated. The centralized MMU 238 virtualization may have the Operating System manages its own page tables.

Hypervisor may have its own hardware components including an interrupt controller logic, and shared cache for storing of communications such as intercepted interrupts etc. Hypervisors ensure interrupts routed to appropriate partition and virtual machine.

The hypervisor allows unmodified guest operating systems to execute in apparent complete isolation. The hypervisor allows running modified or unmodified versions of two or more operating systems, for which source code is readily available, such as Linux and FreeBSD, as well as other OS's real time operating systems, such as Windows or Macintosh type OS. The hypervisor virtual layer will allow open source software to be run on one OS such as Linux or windows and other proprietary software to be run on another OS such as Mac, Real time, etc. This way an OS capable of running any generic process will by default all types of software and another OS resident on the integrated circuit will run software specifically coded to run on that software such as Mac or a real time OS in order to take advantage of the specifics of that specific use OS. With the distributed TLBs, multiple OS's, centralized MMU 238, and hypervisor software working together allows high performance virtualization for the entire System on a Chip.

In a hybrid hypervisor architecture, a small hypervisor kernel controls most IP target core and memory resources, but I/O resources are programmed by device drivers that run in a deprivileged service OS. The guest OS functions in a manner similar to that of a regular OS in that the hypervisor is able to leverage its existing device drivers. However, the guest OS is deprivileged by the hypervisor.

In some embodiment, machine modes and states can be configured in registers in the integrated circuit. A superior privilege level exists for the hypervisor. The two major modes the integrated circuit can be programmed to operate in are Hypervisor and Guest, in which within each mode, a privileged state exist which aids security.

Mode 1 Hypervisor Mode

In the Hypervisor mode-Hypervisor privilege state: some applications can run directly on Hypervisor or a bare-metal OS runs here.

Mode 2 Guest Mode

In the Guest mode state—the Guest OS has a supervisor privilege State while the OS runs on the hypervisor.

Guest mode registers exist in the interconnect to set the mode: one set for OS software and another for the hypervisor. The programmable modes allow a hypervisor to exist on both instances with and without virtualization and always to safely interrupt guest OS execution.

The hypervisor may cooperate with a hardware implementation of the page table walk component or a software implementation of the page table walk component. The page table walk component may define how the bits of the fields for the virtual address translation are formatted. The page table walking code is small and may be part of the hypervisor code. Every time a TLB miss is detected, a special exception may be generated by a processor. The TLB miss is caught by the operating system that saves a task state, performs a page table walk, fills the master TLB, and restores the task state.

Hardware Page Table Walk Logic Unit

The Master TLB updates may be performed automatically by Hardware Page Table Walk logic unit acting as the miss handler mechanism 242. If a miss is evoked when checking a virtual address in a local TLB, then the entries of the master TLB may be checked or the Hardware Page Table Walk logic unit directly checks the page tables. The Hardware Page Table Walk logic unit walks the page tables to see if there is a valid page table entry for the specified virtual address, and if an entry exists for the specified virtual address, then the information is brought into an entry of the master TLB. The logic of the centralized MMU 238 replicates the information in that entry of the master TLB into the one or more local TLBs that should be a shadow copy that information. Next, when the TLB access is retried by the centralized MMU 238 or at the local TLB: this time the access will be a hit/match, and the program or initiator IP core transaction can proceed normally.

If the Hardware Page Table Walk logic unit finds no valid entry for the virtual address in the page tables, the Hardware Page Table Walk logic unit raises a page fault exception, which the operating system software must handle. Handling page faults usually involves bringing the requested data into physical memory, setting up a page table entry to map the faulting virtual address to the correct physical address, and resuming the requested access (potentially by resuming the original program). In some cases, the provided virtual address is erroneous, potentially due to a software bug or an attempt to compromise system security by accessing resources not assigned to the initiator IP core. If the Hardware Page Table Walk logic unit, the hypervisor and/or the operating system determine that there is no legal translation for the provided virtual address, then an address translation error should be returned to the initiator IP core. TLB updates are performed automatically by the page-table walking hardware logic unit.

The master TLB updates are configured to be performed automatically by a Hardware Page Table Walk logic unit acting as the miss handler mechanism 242 when the OS makes a change that would change the information in a page table. Address translation may occur using the virtualization extensions for I/O (VT-d) architecture to define a multi-level page-table structure for DMA address translation. The multi-level page tables enable the Hardware Page Table Walk logic unit to manage memory at 4 KB or larger/super page granularity. The Hardware Page Table Walk logic unit traverses these multi-level page tables using the address from the DMA request.

The Hardware Page Table Walk logic unit may also be configured to support a multi-threaded architecture and use thread concurrency to prevent page table walks from blocking. The Master TLB updates are performed automatically by a Hardware Page Table Walk logic unit acting as the miss handler mechanism 242. The Hardware Page Table Walk logic unit supports a multi-threaded architecture by the logic mapping the page table walk to separate threads and dynamically assigning a thread tracking mechanism on a per thread from each IP core basis so that it's performance can be properly prioritized at the target DRAM core and the flow control logic in the interconnect can guarantee that the thread cannot get blocked.

The Hardware Page Table Walk logic unit may also be configured to support several page tables, where the logic unit would select the page table based upon ID information associated with a communication transaction, such as an initiator core ID, a target core ID, a virtual machine ID and/or operating mode ID information (e.g. kernel vs. user, secure vs. non-secure, etc.). Note, the on-chip logic for security firewalls and Quality of Service in the integrated circuit may also have registers and logic configured to use similar ID information.

The Master TLB updates may be performed by the Hardware Page Table Walk logic unit acting as the miss handler mechanism. The Hardware Page Table Walk logic unit may be also configured to manage variable size memory pages at 4 KB or larger/super page granularity, which are frequently associated with multiple level page tables. Note that OS or hypervisor-based page table walk approaches can also support variable size memory pages. The master and local TLB entries may include fields to indicate the size of the virtual page translated by each entry.

In a similar manner, the Hardware Page Table Walk logic unit is configurable, in a DMA case, to walk a fabricated instance with larger super pages of greater than 4 kilobytes for the address from the DMA request. The amount and actual size of the larger super pages is balanced to minimize the number of local TLB misses while not taking up too much power and area. The configuration of page sizes may occur at design time or run time when the instance is fabricated. The program module, at run time or design time, offers a nice range of mixed page sizes, page size of four Kbytes, larger super pages, and other page sizes, as well as an option to not to use the CPU to perform the address translation. The large "page table entries" (super pages) are replicated in the master TLB for entries of local TLBs servicing I/O devices, bridges, or other IP cores in which the use of super pages improves performance.

As discussed, the centralized MMU 238 logic has coded functions of maintaining the master TLB virtual address to a physical address information, decoding, and mapping of a virtual address to a physical address, and other functions. Substantial synergies can exist by having the centralized MMU 238 logic with its coded address functions coupled with other addressing functions performed on the integrated circuit. For example, the same logic hardware in the MMU 238 that tracks the virtual address to physical address decoding and mapping functions may also track a physical address to actual device at that physical address decoding and mapping functions. Thus, the same logic that makes the virtualization of the integrated circuit may also be coded to perform the routing functions within the chip. The same logic hardware in the MMU 238 allows run-time programmable address mapping/routing.

Accordingly, normally two look-ups and two tables need to be maintained from most transactions in the integrated circuit. A first look up occurs for the virtual address to the physical address. A second look up occurs for the physical address and what physical device has been assigned to that physical address. The master TLB may maintain mappings of all three fields so that merely one look up need to occur for a virtual address or device ID to a physical address. Also, merely the master TLB merely needs to be maintained and then its hardware logic replicates that information into the corresponding local TLBs when the information changes. This causes merely one centralized table to be maintained rather than multiple tables needing to be maintained with addressing related information. The dynamic and specific assignment of physical addresses to devices from PCI elaboration and other similar address assigning operations may be also stored in the entries of the master TLB. The run-time programmable features of the centralized MMU include software visible registers for address mapping that provide: 1) programmable target IP core address mapping to enable dynamic assignment of targets to physical address regions, 2) programmable addressing for an aggregate target IP core with multiple memory channels including parameters of an interleaved channel map, number of channels, region size, and any combination of these, 3) configuring interconnect routing pathways at run time to dynamically control transaction congestion, avoid powered down routes within the interconnect during operation of the integrated circuit and any combination of both, 4) separate partial or full address maps for different initiator IP cores, and 5) any combination of one or more of these four functions.

Input-Output Devices

The centralized MMU 238 and 1) the local TLB in the I/O bus controller or 2) shared pool of local TLBs allows accelerators and I/O devices to work in virtual address space of the integrated circuit while being able to route transactions to and from the I/O.

When 1) an initiator IP core or an Input Output device is not initially set up/designed to be a virtualized system or 2) the integrated circuit is without a hypervisor, then the OS changes page table information for a TLB entry of its IP cores and the OS has to forward the information to the driver in charge of managing the centralized MMU engine 238 to flush the same entry (if it is present) in the master TLB. The logic in the centralized MMU engine will propagate the information to all local TLBs containing a shadow copy of that entry to perform the same operation, and the logic in the MMU 238 merely distributes CPU TLB operations that result from the OS changing the page tables (virtual/physical translation, shareability, etc.) for pages that are covered by the local TLBs the interconnect fabric and would require fabric TLB invalidations.

When an initiator IP core or an Input Output device is designed/set up to be a virtualized system, the hypervisor software can flush the master TLB without modifying the OS and then the hypervisor software can propagate the operation to centralized master TLB transparently on behalf of the OS. The hypervisor software provides a safe external way to receive notification of TLB operations and send them to the master TLB. The logic in the master TLB then propagates the shadow copied entry into the corresponding local TLBs.

A field may be provided with the virtual address to the TLBs and the centralized memory management unit in order to implement guest virtual machines, each with their own guest OS and logical assigned partition of shared integrated circuit resources.

The centralized memory management unit may be configured to support guest virtual machines. Each virtual machine with their own guest OS and logical assigned partition of shared integrated circuit resources. The centralized memory management unit enables guest virtual machines, each with their own guest OS and logical assigned partition of shared integrated circuit resources, to directly use peripheral devices, such as Ethernet, accelerated graphics cards, Input-Output devices including external hard-drive controllers, through direct memory access (DMA) and interrupt remapping. The centralized MMU connects a DMA-capable I/O bus to the main memory and uses the local TLB at the agent for the I/O bus to increase performance. The local TLB contains the CPU-visible virtual addresses and the translations to the physical addresses of the 10 devices. The centralized memory management unit may use virtualization extensions for I/O (VT-d) to support the remapping of I/O DMA transfers and device-generated interrupts. The local TLB for the I/O bus contains entries for super sized page table entries of greater than 4 Kilobytes in size for the addresses of the I/O devices connecting to the integrated circuit.

The VT-d architecture enables DMA and interrupt requests from an I/O device to be isolated by hypervisor to its assigned protection domain. Each OS runs within its own virtual machine on the integrated circuit, and the hypervisor exposes virtual (emulated or paravirtualized) remapping of hardware resources to each virtual machine. The OS may create one or more protection domains each with its own DMA Virtual Address (DVA) space and program the virtual remapping hardware structures to support DVA to Guest Physical Address (GPA) mappings. The hypervisor must virtualize the remapping hardware by intercepting guest accesses to the virtual hardware and shadowing the virtual remapping structures to provide the physical hardware with structures for DVA to HPA mappings. Similar page table shadowing techniques are commonly used by the hypervisor for CPU MMU virtualization.

The VT-d extensions for I/O enable system software to create multiple DMA protection domains. A protection domain is abstractly defined as an isolated environment to which a subset of the host physical memory and other shared resources are allocated. Depending on the software usage model, a DMA protection domain may represent memory allocated to a virtual machine, or the DMA memory allocated by a guest-OS driver running in a virtual machine. These VT-d extensions for I/O enable system software to assign one or more I/O devices to a given protection domain. DMA isolation is achieved by restricting access to a protection domain's physical memory from I/O devices not assigned to it, through address-translation tables.

I/O devices are generally sharable among multiple guest OSs. VT-d enables the direct assignment of these I/O devices to guest virtual machines. These VT-d extensions enable PCI Express devices to support multiple virtual functions, each of which can be discovered, configured, and managed. This allows the direct assignment of a virtual function to a virtual machine using VT-d, thus allowing a single physical I/O device to be sharable among multiple virtual machines.

Note, direct memory access allows certain hardware subsystems within the integrated circuit to access system memory for reading and/or writing independently of the central processing unit of an initiator IP core. Many hardware systems use DMA including disk drive controllers, graphics cards, network cards and I-O devices. DMA may also be used for intra-chip data transfer in multi-core processors, especially in multiprocessor system-on-chips, where its processing element is equipped with a local memory and DMA is used for transferring data between the local memory and the main memory. Integrated circuits that have DMA channels can transfer data to and from devices with much less CPU overhead than computing devices without a DMA channel. Similarly, a processing element inside a multi-core processor can transfer data to and from its local memory without occupying its processor time and allowing computation and data transfer concurrency. A DMA engine in an embedded processor allows its processing element to issue a data transfer and carries on its own task while the data transfer is being performed.

Without DMA, using programmed input/output (PIO) mode for communication with peripheral devices, or load/store instructions in the case of multiple core chips, the CPU of an initiator IP core is typically fully occupied for the entire duration of the read or write operation, and is thus unavailable to perform other work. With DMA, the CPU of an initiator IP core would initiate the transfer, do other operations while the transfer is in progress, and receive an interrupt from the DMA controller once the operation has been done. This is especially useful in real-time computing applications where not stalling behind concurrent operations is critical. Another and related application area is various forms of stream processing where it is essential to have data processing and transfer in parallel, in order to achieve sufficient throughput.

Also, the VT-d architecture defines a multi-level page-table structure for DMA address translation. The multi-level page tables enable software to manage memory at 4 KB or larger page sizes (2 MB, 1 GB, etc.) granularity.

Similar to I/O devices, separate chips could also share one centralized MMU and master TLB and then utilize the distributed TLB system. Alternatively, one centralized MMU may be instantiated per chip. The two separate chips may exchange communication transactions with the use of a local TLB for each chip that supports transactions entering that chip from the other chip, where each local TLB is maintained by the associated centralized MMU to stay coherent with the associated master TLB and page table. If the centralized MMU on each chip references the same shared page table, then both chips will have a consistent and coherent view of the virtualization and sharing of resources on both chips. Each local TLB for entry onto the chip may be located in the agent that supports the chip-to-chip connection such as a bridge.

Alternatively, multiple MMUs exist in a single integrated circuit and one centralized MMU exists per bus interconnect instance in the integrated circuit. It is possible to have more than one centralized device MMU per integrated circuit depending on the number of request the centralized TLB will have to handle. In some integrated circuits it might be necessary to have several MMU to support request traffic to minimize the number of local TLB misses, so as to more easily manage the coherence between the centralized TLBs.

User Configurable Parameters

Each instance of the integrated circuit has a runtime user programmable parameter that allows a creator of that instance of the integrated circuit to set various parameters.

A software visible register makes up part of the centralized MMU and allows run-time programmable address mapping/routing into the MMU. Thus, the hardware logic in MMU is configured to read values from 1) the internal software visible register for run-time programmable addressing in the interconnect, 2) an indirection register to access configuration space and hardware-based addressing in the MMU, 3) create distributed dynamic address maps in MMU and the other programmable parameters described herein. The hardware logic in MMU also uses a register set for translation layer of PCI to Memory hierarchy (including on-chip memory, die2die memory, and off-chip memory).

Some additional run-time programmable features for each instance of the integrated circuit include: 1) address mapping/routing into a software visible register making up part of the centralized MMU to assist in supporting PCI elaboration, 2) configuring multiple memory channel addressing, i.e. interleaved multichannel DRAM support (# channels, region start/size, channel map), 3) configuring network routes at run time to control congestion, boot from flash/remap boot addresses & INT vectors to DRAM, 4) separate partial/full address maps for different initiators, and other similar dynamic address mapping uses.

As discussed, a power manager may be configured to cooperate with the one or more local TLBs to check network routes during an operation of the integrated circuit and communicate when a link or pathway in the suggested route in the interconnect is powered down at that moment or has a communication transaction out to a power down section of the integrated circuit. Then, the power manager cooperating with the local TLBs is configured to provide routing updates to create another route for the communication transaction to traverse to get to its final destination via pathways and links that are currently powered up. Thus, segments of the integrated circuit may be powered down and powering up that entire section of the chip just so a transaction may pass through the links and pathways of that section may not make as much sense as creating a different route for the transaction to take to go from that agent to its final destination. Thus, dynamic routing may be used to avoid powered down sections of the interconnect and the power manager causes the routing updates to occur. However, the local TLB may also track all of the power states and possible routes around powered off sections. Also, dynamic routing may be used to avoid congestion hot spots in the interconnect that appear in certain operating modes.

Note, an address decoder in an initiator agent may be configured to have a dynamic physical address to target selection capability. The address decoder in the initiator agent can be augmented with the local TLB structure having a design time configurable number of entries in that TLB and where each TLB entry stores the target ID that is selected by the physical address associated with the entry. Entries in a local TLB may have fields that allow them to be programmed to be individually locked down so that the normal TLB miss handling will not replace them. Each local TLB may be configured to have a different number of entries in that local TLB compared to the number of entries in another local TLB. Some TLBs may have a large number of entries to support many simultaneously active virtual pages or dynamic target mappings while other local TLBs may have many fewer entries that map large virtual pages to reduce the cost of the local TLBs while efficiently support initiator IP cores that perform large block transactions. Also, whether the local TLB or the pool of local TLBs will be instantiated is determined when that integrated circuit is being designed. Furthermore, because some initiator IP cores like CPUs may embed their own MMU, local TLBs may be independently configured to disable some of the virtualization and sharing features, such as virtual address translation while still enabling others such as dynamic physical address to target selection. For instance, a first local TLB may provide virtual address translation for a first initiator IP core while a second local TLB provides dynamic physical address to target selection capability without any virtual address translation for a second initiator IP core that embeds its own MMU. An agent for a first initiator IP cores may be instantiated to have a local TLB and supports virtualization while an another agent for a second initiator IP core on the same integrated circuit merely gets to operate in only a physically addressed manner without virtualization support.

Thus, some initiator IP cores may be instantiated to have local TLBs while other initiator IP cores on the same integrated circuit merely get to operate in only a physically addressed manner without virtualization support and therefore would not need a local micro TLB in their Agent. The local micro TLB is an optional feature of the agent and simply augments the existing address decoding/target capabilities table of the agents. The designer of the integrated circuit will choose to add virtualization support to their platforms, and the distributed TLB system provides an efficient hardware implementation for those initiator and target IP cores that are not virtualized.

During boot up, PCI elaboration occurs to detect and assign hardware devices connected to the PCI bus. The centralized MMU logic is coded to detect and identify hardware devices connected to the PCI bus and dynamically assign them physical addresses. The centralized MMU is configurable with configuration parameters to specify that when a certain hardware device is found, then that hardware is assigned a specific physical address while one or more of the remainder of the hardware devices connected to the PCI bus are each dynamically assigned one of the available physical addresses.

In some embodiments, the address mapping capabilities of the centralized MMU are used to initially map initial program loading and interrupt service vector addresses from one or more CPUs into a non-volatile memory to enable the CPU booting process and then the boot software reprograms the centralized MMU to remap those addresses into volatile memory (such as DRAM) to enable higher performance and/or interrupt servicing flexibility. In other embodiments, during operation, the logic remaps boot addresses and interrupt vectors from the non-volatile memory to a fast performing volatile memory, such as DRAM during a soft reset/reboot of the integrated circuit. Boot up of the processors in the integrated circuit occurs from the processors looking to a well-known address in non-volatile memory such as flash, and executing the instructions in the non-volatile memory. During operation, the logic remaps boot addresses and interrupt vectors to a fast performing volatile memory, such as DRAM during a soft reset/reboot of the integrated circuit.

Memory Issues

As discussed, the centralized MMU and distributed TLBs support virtual memory including on core IP memory target cores as well as memory devices connected via the I/O bus.

Secondary storage, such as a hard disk, memory stick, etc. as an I/O device, can be used to augment physical memory embedded in the integrated circuit. Pages can be swapped in and out of physical memory and the disk. The present bit entry in the TLB can indicate what pages are currently present in physical memory or are on the I/O memory device, and can indicate how to treat these different pages, i.e. whether to load a page from disk and swap another page in physical memory out. This virtual memory system, presents itself as a uniform, contiguous addressing of physically separate and non-contiguous memory and disk areas. The TLBs and page tables map an assigned virtual address to an actual physical address.

The MMU may re-map addresses to achieve memory migration so a different chunk/channel of a memory space, such as in a DRAM, would cover some addresses, while leaving a contiguous address space for software. Alternatively, the hardware logic in the centralized MMU aids in memory allocation & migration. The centralized MMU performs memory migration to re-locate data when the memory configuration changes such as a power down of a memory channel of a multiple channel target memory core. With the understanding of how the power regimes of the integrated circuit operate, the MMU may manage fragmented physical memory map via allocated regions of memory. Large regions of memory can be allocated without the need to be contiguous in physical memory and the MMU will take care of mapping contiguous virtual addresses to the underlying fragmented physical addresses.

Address Translation

As discussed, address translation occurs from virtual address to real physical address. Fields can be added onto or modified with the address sent from the initiator IP core and the eventual real physical address is decoded and retrieved in the entry of the TLB. Examples of field to be added or techniques to modify the virtual address sent by the initiator include a Page Address Offset, a TLB number or ID addition, applying various ciphering algorithms to the address, adding a real page number field, having a real page number offset, having a logical partition ID to be matched against a Logical Partition Identification Register, etc. In an example, the bottom 'n' number of bits of the address (the offset within a page) are left unchanged. The upper address bits are the (virtual) page number. The MMU will incorporate these translation parameters and variables to translate virtual page numbers to physical page numbers. Note a Logical Partition Identification Register used in virtual address translation contains the partition ID of the current guest OS and is set by the hypervisor or other miss handler mechanism.

Note, the heterogeneous initiator IP cores may or may not have their own internal matching MMUs. Also, accelerators & I/O devices do not normally have MMUs at all. Thus, the interconnect maintains the system wide centralized MMU for the integrated circuit, which structurally couples with the register target.

Hardware logic can exist in the MMU to support PCI device enumeration (as in Windows Plug & Play). Hardware logic can exist in the MMU to support hardware-based addressing, such as used in PCI configuration space for the configuration register blocks of Input-Output devices. Hardware logic can exist in the MMU to signal to the interconnect system that it should match particular end to end semantics, such as PCIe ordering semantics.

In an embodiment, the Interconnect has flow control logic that cooperates with the centralized MMU. The flow control logic is highly configurable, supports multiple threads from each initiator IP core, supports non-blocking communications with respect to threads and transactions from initiators to other initiator cores, which all guarantees end-to-end performance by managing all of the data, control, and test flows between IP cores. The interconnect provides low latency access for a large number of low bandwidth, physically dispersed target cores, while maintaining a very low interconnect die area. A separate partial and/or full address map for different initiators is supported.

The interconnect solution has an address map to support multiple address regions, such as 132 address regions. Two or more of the regions are reserved for the interconnect system registers, and several of the regions are allocated for registers that address initiator interfaces. The remaining regions are for target cores and associated target registers. All accesses are memory mapped and each agent that is the target of a request has a set of address matchers. The interconnect address matching mechanism may consist of up to eight segments of equal size. Each segment can have a fixed number of address regions specified at design-time. The initiator subsystem register holds information about the number of segments, regions, and protection groups.

Note, in a mixed system, some local TLBs do full virtualization (including translation), others do partial virtualization (no translation), and some initiators or certain address ranges have no virtualization. In a CPU case, the local TLB may not need to do Virtual Address to Physical Address translation or do protection checking, but does need other capabilities of the local TLB. The CPU case may have an internal MMU, but needs other virtualization. The IP cores that have direct physical addresses and no mapping/routing flexibility and target address regions that are always physically mapped (like ROM or some I/O devices).

Figure 4:
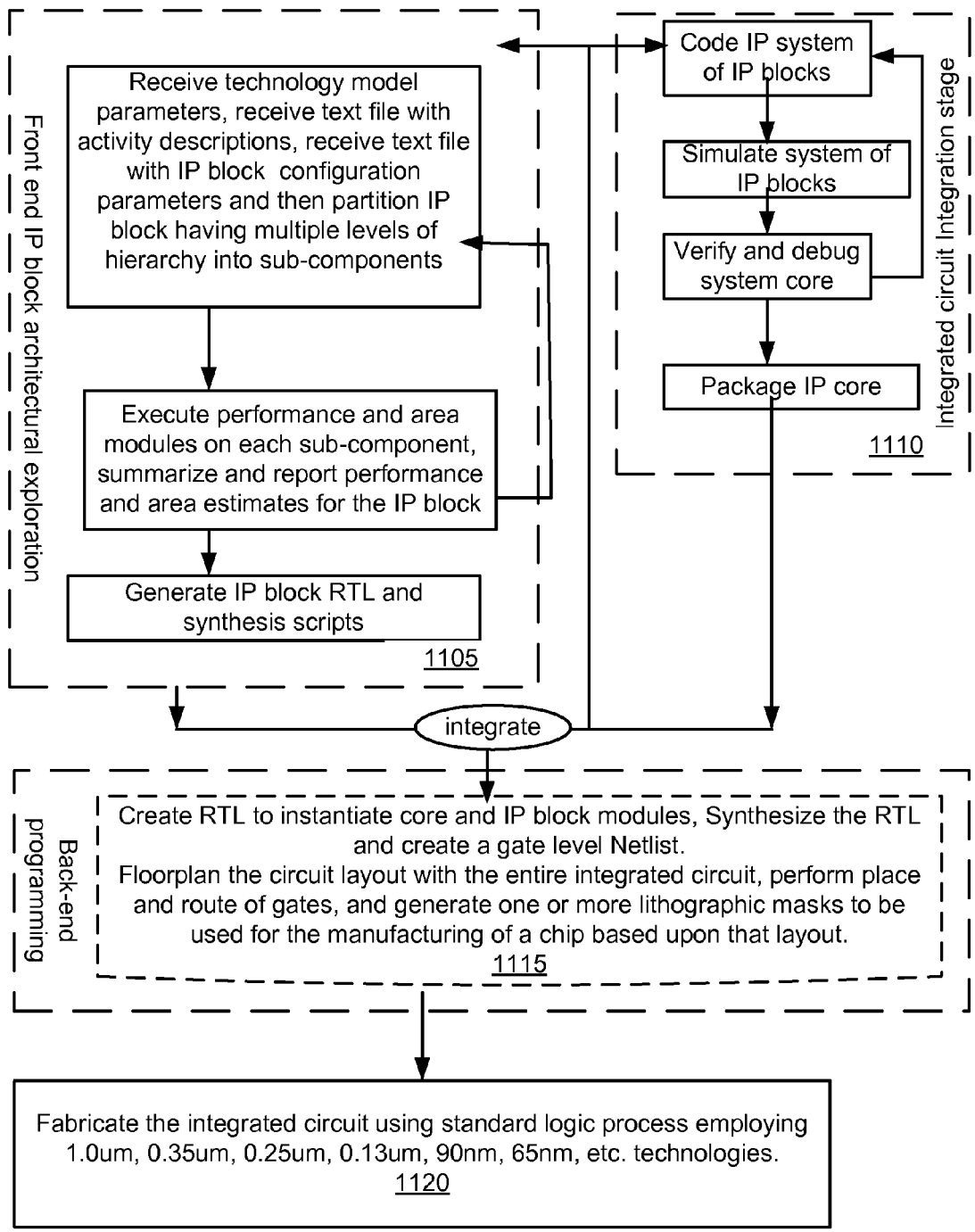
FIG. 4 illustrates a flow diagram of an embodiment of an example of a process for generating a device, such as a System on a Chip, with the designs and concepts discussed above for the Interconnect and Memory Scheduler.

FIG. 4 illustrates a flow diagram of an embodiment of an example of a process for generating a device, such as a System on a Chip, with the designs and concepts discussed above for the interconnect and virtualization components. The example process for generating a device with designs of the interconnect and virtualization components may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset such may be a single tool or a compilation of two or more discrete tools. The information representing the apparatuses and/or methods for the circuitry in the interconnect, virtualization components, etc. may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or model representations of the apparatuses such as simulations and lithographic masks, and/or methods described herein. For example, a machine-readable storage medium may store instructions, which when executed by the machine causes the machine to generate model representations for the interconnect, which are used in the Electronic Design Automation process.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 1105, the EDA tool set may receive a user-supplied text file having data describing configuration parameters and a design for at least part of an interconnect and/or virtualization components. The data may include one or more configuration parameters for that IP block. The IP block description may be an overall functionality of that IP block such as an Interconnect, memory scheduler, etc. The configuration parameters for the interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 1110, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged, and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software-coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 1115, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 1120, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs.

As discussed, an EDA tool set may be implemented in software as a set of data and instructions, such as an instance in a software library callable to other programs or an EDA tool set consisting of an executable program with the software cell library in one program, stored on a machine-readable medium. A machine-readable storage medium may include any mechanism that provides (e.g., stores and/or transmits) information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In an embodiment, the logic consists of electronic circuits that follow the rules of Boolean Logic, software that contain patterns of instructions, or any combination of both. Various components described above may be implemented in hardware logic, software, or any combination of both.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

I claim:

1. An interconnect for an integrated circuit to pass communication transactions between one or more initiator Intellectual Property (IP) cores and one or more target IP cores coupled to the interconnect, comprising:
    a centralized Memory Management logic Unit (MMU) for the interconnect and its connected devices,
    where the centralized MMU is located in the interconnect for virtualization and sharing of integrated circuit resources, which include the one or more target IP cores, the interconnect, and the one or more initiator IP cores;
    a master translation look aside buffer (TLB), which is part of the centralized MMU, is configured to store virtualization and sharing information in entries of the master TLB; and
    a set of two or more local translation look aside buffers (TLBs), which are each associated with one or more local initiator IP cores, are configured to store virtualization and sharing information replicated from the master TLB in the centralized MMU,
    where the master TLB and the set of local TLBs form a distributed system that provides virtualization and sharing services to the IP cores.

2. The integrated circuit of claim 1, further comprising:
    where hardware logic in the centralized MMU has a detection unit coded to automatically detect for page table update operations generated by the one or more initiator IP cores on the interconnect, which causes a miss handler mechanism to update the information stored in one or more of the entries of the master TLB, and then the virtualization and sharing information in the master TLB is updated in entries of one or more local TLBs of the set of local TLBs; and
    where the hardware logic updates the master and local TLB entries by
    1) copying changed information to the master TLB and forwarding the changed information to the one or more local TLBs,
    2) invalidating existing entries that may be impacted by the page table update operations and letting the miss handler mechanism fetch a proper replacement the next time the translation is needed, and
    3) any combination of these.

3. The integrated circuit of claim 1, further comprising:
where each local TLB in the set of local TLBs stores a subset of the virtualization and sharing information replicated from the master TLB;
and
where the subset of the virtualization and sharing information replicated and stored in the corresponding local TLB is relevant to the one or more initiator or target IP cores, and
where the subset of the virtualization and sharing information replicated and stored means that
  1) there are fewer entries in each local TLB than the amount of entries in the centralized MMU,
  2) each entry in the local TLB has less information than the corresponding entry in the master TLB, and
  3) any combination of both.

4. The integrated circuit of claim 1, further comprising:
where both the centralized MMU and some or all of the set of local TLBs are instantiated and located
  1) in the interconnect,
  2) in a respective initiator agent that is coupled between a main fabric of the interconnect and a first initiator IP core itself,
  3) in an I/O bus controller coupled between I/O devices connected to the integrated circuit and the main fabric of the interconnect,
  4) in a bridge agent between two discrete chips,
  5) in the bridge agent between two discrete interconnects, and
  6) any combination of the five.

5. The integrated circuit of claim 1, further comprising:
hardware logic in the centralized MMU that is configured to cooperate with a miss handler mechanism to manage the sharing of integrated circuit resources;
wherein the miss handler mechanism is selected from one or more of the following
  1) an operating system software (OS) resident in the integrated circuit,
  2) a hypervisor software resident in the integrated circuit,
  3) a Hardware Page Table Walk logic unit, or
  4) any combination of the three cooperating together along with the centralized MMU to do a page table walk in order to update the entries in the master TLB in the centralized MMU.

6. The integrated circuit of claim 5,
wherein the hypervisor software is configured to send centralized MMU entry invalidations without involving the OS when an entry in the page table is updated or has an entry invalidated, and
where the hypervisor software maintains a coherence of the centralized MMU with other MMU's in the system without modifying the OS and propagates OS-directed TLB operations to cause master TLB invalidations on behalf of the OS; and thus, the hypervisor software provides a safe external way to receive notification of the TLB operations and send associated invalidations to the master TLB, and the hardware logic in the centralized MMU then propagates the associated invalidations that occur in the master TLB to the local TLBs.

7. The integrated circuit of claim 5,
wherein the miss handler mechanism is also configured to manage variable size memory pages, and
wherein the master TLB entries and local TLB entries include information to indicate a size of a virtual page translated by each entry.

8. The integrated circuit of claim 1,
wherein the entries in the master TLB also store information generally not in a page table, including information not managed by an operating system software selected from
  1) an identifier for a target agent associated with an address translation entry,
  2) address decoding parameters of an aggregate target IP core with multiple channels,
  3) address tiling parameters of one or more address regions making up a system address map, and
  4) any combination of these items of information,
wherein entries in a first local TLB store additional information generally not
  1) in a page table,
  2) in the entries of the master TLB entries, and
  3) information not managed by an operating system software, and
where the additional stored information in the first local TLB is selected from
  1) an identifier for a target agent associated with the address translation entry,
  2) address decoding parameters of the aggregate target IP core with multiple channels,
  3) address tiling parameters of the one or more address regions making up the system address map,
  4) detailed routing information to describe interconnect pathways used by requests issued by the first local TLB's associated initiator IP cores over the interconnect to various target agents connected to the interconnect, and
  5) any combination of these items of information.

9. The integrated circuit of claim 1,
wherein the centralized MMU is a logic hardware component responsible for handling accesses to shared integrated circuit resources, including memory target IP cores, requested by the initiator IP cores, and
where the centralized MMU has a software based miss handler mechanism that cooperates with the MMU's logic to implement addressing software and hardware features handled within the interconnect that include
  1) virtualizing an address decode of an aggregate target IP core with multiple channels,
  2) facilitating non-blocking transaction flow control for request and response communication transactions across the interconnect,
  3) virtualizing address tiling of one or more address regions making up a system address map, and
  4) cooperating with a hypervisor software to isolate an operating system software from needing to know virtualized address details of the shared integrated circuit resources.

10. The integrated circuit of claim 1,
wherein the entries in the master TLB include a translation of a virtual address of an integrated circuit resource to a physical address of that integrated circuit resource in the integrated circuit.

11. The integrated circuit of claim 1,
wherein the set of local TLBs consist of two types of TLBs selected from
  1) a local TLB located in an agent for an individual initiator IP core and
where each pooled local TLB is shared by a group of initiator IP cores that do not have individual local TLBs, and where each pooled local TLB shared by the group of initiator IP cores is located in the interconnect near the group of initiator IP cores.

12. The integrated circuit of claim 1,
wherein the centralized MMU in cooperation with a hypervisor software, which acts as a miss handler mechanism, restricts a given initiator IP core's accesses to a physical address space in the integrated circuit, including memory address space, and also enforces input output (I/O) device memory accesses via creating logical partitions and maintaining page tables.

13. The integrated circuit of claim 1, further comprising:
an address decoder in an initiator agent that is configured to have a dynamic physical address to target selection capability and the initiator agent also has a first local TLB having a configurable number of entries in the first local TLB,
where the number of entries in the first local TLB are individually locked down per initiator agent via design time programming, and
where the first local TLB is configurable to have a different number of entries in the first local TLB compared to a number of entries in a second local TLB.

14. The integrated circuit of claim 1,
where the entries in the master TLB also include protection information to indicate
1) a given IP core's mode of operation,
2) virtual machine ID bits, and
3) any combination of these entries in the master TLB that can prohibit a communication transaction's access to a virtual page, and wherein the access is not allowed if a communication transaction's protection information is not compatible with the protection information in the entries in the master TLB entry.

15. The integrated circuit of claim 1,
where a first local TLB in the set of local TLBs is configured to provide virtual address translation for a first initiator IP core while a second local TLB in the set of local TLBs is configured to provide dynamic-physical address-to-target-selection capability without any virtual address translation for a second initiator IP core that embeds in its own MMU.

16. The integrated circuit of claim 1,
wherein run-time programmable features of the centralized MMU include software visible registers for address mapping and routing that provide:
1) programmable target IP core address mapping to enable dynamic assignment of targets to physical address regions,
2) programmable addressing for an aggregate target IP core with multiple memory channels including parameters of an interleaved channel map, a number of channels, a region size, and any combination of these,
3) configuring interconnect routing pathways at run time to dynamically control transaction congestion, avoid powered down routes within the interconnect during operation of the integrated circuit, or any combination of both,
4) separate partial or full address maps for different initiator IP cores, and
5) any combination of one or more of these four functions.

17. The integrated circuit of claim 1,
wherein the centralized MMU is configured to support guest virtual machines, each virtual machine with its own guest operating system and assigned logical partition of shared integrated circuit resources, and
where the centralized MMU is also configured to use virtualization extensions.

18. A machine-readable non-transitory storage medium that stores instructions, which when executed by a machine causes the machine to generate model representations for the interconnect of claim 1, which are used in the Electronic Design Automation process.

19. The integrated circuit of claim 1,
wherein two or more chips each have a first centralized MMU and a first local TLB instantiated per chip configured to support exchange of communication transactions with the other chip(s),
where each first local TLB is maintained by an associated first centralized MMU to stay coherent with an associated master TLB and page table,
where by referencing a same shared page table, the two or more chips have a consistent and coherent view of virtualization and sharing of resources on the two or more chips, and
where the first centralized MMU is
1) the centralized MMU for that chip,
2) a discrete MMU from the centralized MMU of that chip, and
3) any combination of both.

20. The integrated circuit of claim 1, wherein logic of the centralized MMU is coded with functions of tracking, decoding, and mapping of a virtual address to a physical address, and
wherein the MMU is also configured to map a given IP core to its physical address by tracking and decoding a physical address to the IP core located at that physical address.

21. The integrated circuit of claim 1,
wherein logic of the centralized MMU is coded to detect and identify hardware devices connected to a PCI bus and dynamically assign them physical addresses, and
where the centralized MMU is configurable with configuration parameters to specify that when a certain hardware device is found, then that hardware device is assigned a specific physical address while one or more of the remainder of the hardware devices connected to the PCI bus are each dynamically assigned one of the available physical addresses.

22. The integrated circuit of claim 1, further comprising:
a power manager configured to cooperate with the one or more local TLBs to check network routes during an operation of the integrated circuit and communicate when a link or pathway in a suggested network route in the interconnect is powered down at that moment or has a communication transaction out to a powered-down section of the integrated circuit, and then the power manager cooperating with the local TLBs is configured to provide routing updates to create another network route for the communication transaction to traverse to get to its final destination via pathways and links that are currently powered up.

23. A method for an interconnect and its connected devices for virtualization and sharing of integrated circuit-shared resources, comprising:
virtualizing and sharing integrated circuit resources that include target IP cores, the interconnect, and one or more initiator Intellectual Property (IP) cores;
storing virtualization and sharing information in entries of a master translation look aside buffer (TLB), which is part of a centralized Memory Management logic Unit (MMU), the MMU located in the interconnect, where the virtualization and sharing information includes a translation of a virtual address of an integrated circuit resource to a physical address of that integrated circuit resource in the integrated circuit; and replicating a subset of the entries in the master TLB into a distributed set of local TLBs, which are each associated with one or more local initiator IP cores, where the master TLB and the set of local TLBs form a distributed system that provides the virtualization and sharing resources to the IP cores.

24. A machine-readable non-transitory storage medium that stores instructions, which when executed by a machine causes the machine to generate model representations for the method of claim 23.

* * * * *